US012748703B2

(12) United States Patent
Devarajalu et al.

(10) Patent No.: US 12,748,703 B2
(45) Date of Patent: Sep. 29, 2026

(54) SYSTEM AND METHOD OF PERFORMING DECOMPRESSION OF PAGE DATA ASSOCIATED WITH A PLURALITY OF APPLICATIONS

(71) Applicant: SAMSUNG ELECTRONICS CO., LTD., Suwon-si (KR)

(72) Inventors: Senthil Kumaran Devarajalu, Bangalore (IN); Sharon Devasia Isac, Bangalore (IN); Sri Harsha Katamaneni, Bangalore (IN); Prashanth Karnamadakala, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 172 days.

(21) Appl. No.: 18/830,851

(22) Filed: Sep. 11, 2024

(65) Prior Publication Data

US 2026/0023688 A1 Jan. 22, 2026

(30) Foreign Application Priority Data

Jul. 17, 2024 (IN) ............................ 202441054530

(51) Int. Cl.
*G06F 12/0862* (2016.01)
*G06F 3/06* (2006.01)

(52) U.S. Cl.
CPC ........ *G06F 12/0862* (2013.01); *G06F 3/0608* (2013.01); *G06F 3/0656* (2013.01); *G06F 3/0673* (2013.01); *G06F 2212/602* (2013.01)

(58) Field of Classification Search
CPC .. G06F 12/0862; G06F 3/0608; G06F 3/0656; G06F 3/0673; G06F 2212/602;
(Continued)

(56) References Cited

U.S. PATENT DOCUMENTS 7,617,499 B2 11/2009 Bradford et al.
8,106,799 B1 1/2012 Yang et al.
(Continued)

OTHER PUBLICATIONS

Extending data prefetching to cope with context switch misses; 2009 IEEE International Conference on Computer Design.
(Continued)

*Primary Examiner* — Hosain T Alam
*Assistant Examiner* — Alan Otto
(74) *Attorney, Agent, or Firm* — Morgan, Lewis & Bockius LLP

(57) ABSTRACT

A method of performing decompression of page data associated with a plurality of applications installed in a User Equipment (UE) includes detecting a context-switching event between at least one first application and at least one second application and prefetching compressed data including a plurality of tokens, parsing each of the plurality of tokens of the prefetched compressed data from the memory buffer and identifying a data format of each of the plurality of tokens, re-encoding each of the parsed tokens and temporarily storing the re-encoded parsed tokens in an instruction queue of an output handler, generating decompressed data, continuously collecting the generated decompressed data into an output packer, and performing a writing operation to write a single line of the data from the collected decompressed data into the output memory.

20 Claims, 6 Drawing Sheets

300

(58) Field of Classification Search
CPC ........................ G06F 12/023; G06F 2212/401; H03M 7/607; H03M 7/46; H03M 7/3084; H03M 7/6017
See application file for complete search history.

(56) References Cited

U.S. PATENT DOCUMENTS

| | | | | |
|---|---|---|---|---|
| 9,287,893 | B1 | 3/2016 | Pflederer | |
| 9,384,036 | B1 | 7/2016 | Barroso et al. | |
| 10,069,512 | B2 | 9/2018 | Gopal et al. | |
| 10,838,725 | B2 | 11/2020 | Havlir et al. | |
| 2001/0038642 | A1* | 11/2001 | Alvarez, II | H03M 7/3088 370/477 |
| 2018/0081814 | A1* | 3/2018 | Gellerich | G06F 12/0811 |
| 2019/0354384 | A1* | 11/2019 | Huang | G06F 9/44573 |
| 2023/0229630 | A1* | 7/2023 | Soha | G06F 16/1724 707/693 |

OTHER PUBLICATIONS

Fang, J., Chen, J., Lee, J., Al Ars, Z., & Hofstee, H. (2019). Refine and recycle: a method to increase decompression parallelism.
Extended European Search Report dated May 20, 2025 issued in corresponding European Patent Application No. 24214728.8.

* cited by examiner

SYSTEM AND METHOD OF PERFORMING DECOMPRESSION OF PAGE DATA ASSOCIATED WITH A PLURALITY OF APPLICATIONS

CROSS-REFERENCE TO RELATED APPLICATIONS

This application claims priority under 35 U.S.C. § 119 to Indian Patent Application number 202441054530, filed on Jul. 17, 2024, the disclosure of which is incorporated by reference herein in its entirety.

TECHNICAL FIELD

Embodiments of Embodiments of the present disclosure relate to data compression technology, and more particularly, to a system and method of performing decompression of page data associated with a plurality of applications installed in a User Equipment (UE).

DISCUSSION OF RELATED ART

Generally, user devices (such as smartphones) store data associated with applications in the form of page data. When an application is minimized in the background, the application is compressed and stored in Dynamic Random Access Memory (DRAM) e.g., Zero-Random Access Memory (ZRAM). The user devices use a page compression technique for compressing the applications to optimize memory usage and enhance overall system performance. For example, a device running the ANDROID operating system may use Lempel-Ziv Oberhumer Run Length Encoding (LZO-RLE) for the purpose of compressing background applications and storing the compressed background applications in the DRAM.

SUMMARY

According to an embodiment of the present disclosure, disclosed is a method implemented in a User Equipment (UE) for performing decompression of page data associated with a plurality of applications installed in the UE. The method includes detecting a context-switching event between at least one first application among the plurality of applications and at least one second application among the plurality of applications. Further, the method includes prefetching, in a memory buffer from an input memory of the UE, compressed data including a plurality of tokens based on detecting the context-switching event. Moreover, the method includes parsing each of the plurality of tokens of the prefetched compressed data from the memory buffer. The method also includes identifying a data format of each of the plurality of tokens of the prefetched compressed data by decoding each of the plurality of parsed tokens. Furthermore, the method includes re-encoding each of the parsed tokens based on the identified data format. The method includes temporarily storing the re-encoded parsed tokens in an instruction queue of an output handler. Further, the method includes generating decompressed data based on a format of the re-encoded parsed tokens. The method also includes continuously collecting the generated decompressed data into an output packer of the output handler. Also, the method includes performing a writing operation to write a single line of the data from the collected decompressed data into an output memory of the UE, based on a configuration of the output memory.

According to an embodiment of the present disclosure, a system for performing decompression of page data associated with a plurality of applications installed in a User Equipment (UE) is disclosed. The system includes a memory and one or more processors communicatively coupled to the memory. The one or more processors are configured to detect a context-switching event between at least one first application among the plurality of applications and at least one second application among the plurality of applications. Further, the one or more processors are configured to prefetch, in a memory buffer from an input memory of the UE, compressed data including a plurality of tokens based on the detection of the context-switching event. Moreover, the one or more processors are configured to parse each of the plurality of tokens of the prefetched compressed data from the memory buffer. The one or more processors are configured to identify a data format of each of the plurality of tokens of the prefetched compressed data by decoding each of the plurality of parsed tokens. Furthermore, the one or more processors are configured to re-encode each of the parsed tokens based on the identified data format. The one or more processors are configured to temporarily store the re-encoded parsed tokens in an instruction queue of an output handler. Further, the one or more processors are configured to generate decompressed data based on a format of the re-encoded parsed tokens. The one or more processors are configured to continuously collect the generated decompressed data into an output packer of the output handler. Also, the one or more processors are configured to perform a writing operation to write a single line of the data from the collected decompressed data into an output memory of the UE, based on a configuration of the output memory. The one or more processors are configured to determine whether the data format of a first parsed token is literal and a sum of length of consecutive parsed tokens including the first parsed token is greater than a line width of the output memory and re-encode, upon a determination that the data format of the first parsed token is literal and the sum of length of the consecutive parsed tokens including the first parsed token is greater than the line width of the output memory, the first parsed token when the length of the first parsed token is less than the line width of the output memory. For re-encoding the parsed tokens, the one or more processors are configured to determine whether the data format of a first parsed token is literal and a sum of length of consecutive parsed tokens including the first parsed token is greater than a line width of the output memory, split, upon a determination that the data format of the first parsed token is literal and the sum of length of the consecutive parsed tokens including the first parsed token is greater than the line width of the output memory, the first parsed token into a plurality of sub-tokens where a maximum length of a sub-token is equal to the line width of the output memory and re-encode the sub-tokens based on the splitting of the first parsed token. For re-encoding the parsed tokens, the one or more processors are configured to determine whether the data format of a first parsed token is zero Run Length Encoding (RLE) or look-back copy (LBC) copy, and a sum of length of consecutive parsed tokens including the first parsed token is greater than a line width of the output memory and re-encode the first parsed token upon a determination that the data format of the first parsed token is the zero RLE or the LBC copy, and the sum of length of the consecutive parsed tokens including the first parsed token is greater than the line width of the output memory. For generating the decompressed data, the one or more processors are configured to extract literal data from the instruction queue of the output handler and perform an additional writing operation to write the extracted literal data directly into the output packer of the output handler. For generating the decompressed data, the one or more processors are configured to extract zero Run Length Encoding (RLE) length from the instruction queue of the output handler and perform an additional writing operation to write, into the output packer of the output handler, the zero RLE length by inserting an appropriate amount of zeros based on a zero RLE length. For generating the decompressed data, the one or more processors are configured to fetch dictionary copy data by extracting an offset and a length of the dictionary copy data from the instruction queue of the output handler and perform an additional writing operation to write the fetched dictionary copy data into the output packer of the output handler. In performing the additional writing operation to write the fetched dictionary copy data into the output packer, the one or more processors are configured to obtain, upon extracting the offset and the length of the fetched dictionary copy data from the instruction queue, a past data reference from the output memory read the fetched dictionary copy data from the output memory based on the obtained past data reference and write the fetched dictionary copy data into the output packer based on the reading of the fetched dictionary copy data from the output memory. In performing the additional writing operation to write the fetched dictionary copy data into the output packer, the one or more processors are configured to obtain, upon extracting the offset and the length of the fetched dictionary copy data from the instruction queue, a past data reference from the output packer read the fetched dictionary copy data from the output packer based on the obtained past data reference and write the fetched dictionary copy data into the output packer based on the reading operation performed on the fetched dictionary copy data from the output packer. In performing the additional writing operation to write the fetched dictionary copy data into the output packer, the one or more processors are configured to obtain, upon extracting the offset and the length of the fetched dictionary copy data from the instruction queue, a past data reference from the output memory and the output packer corresponding to the fetched dictionary copy data read the past data reference that is obtained from the output memory and the output packer, and the fetched dictionary copy data that is present in the output memory and the output packer combine, upon reading of the fetched dictionary copy data, the fetched dictionary copy data from the output memory and the output packer and write the combined dictionary copy data into the output packer based on the fetched dictionary copy data. The re-encoded prefetched compressed data is stored in the instruction queue based on an availability of memory space in the instruction queue of the output handler. The output packer is an internal memory buffer of the output handler for storing the decompressed data. The context-switching event corresponds to an event that indicates a switching operation between at least two applications among the plurality of applications installed in the UE.

BRIEF DESCRIPTION OF THE DRAWINGS

The above and other features of the present invention will become more apparent by describing in detail embodiments thereof with reference to the accompanying drawings, in which.

DETAILED DESCRIPTION

Figure 1:
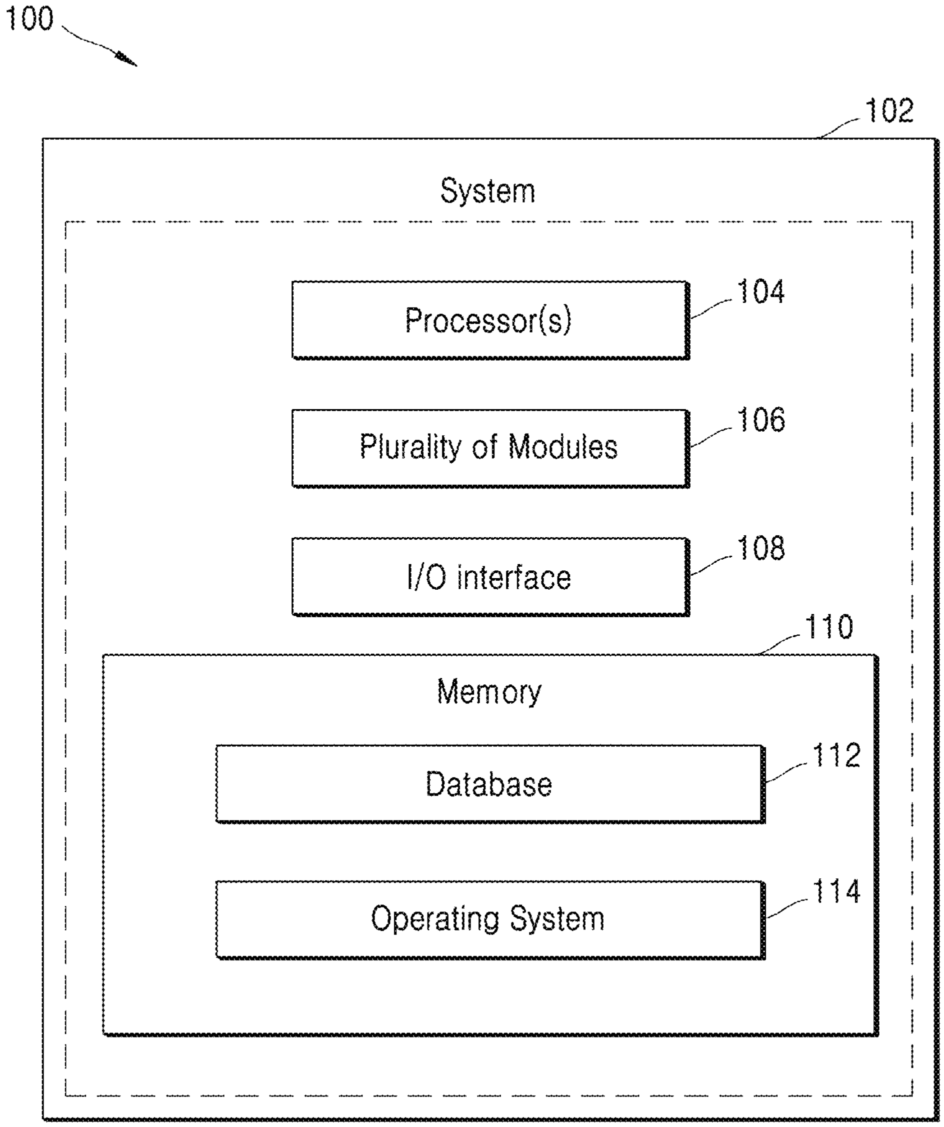
FIG. 1 illustrates a block diagram of a user equipment (UE) including a system for performing decompression of page data associated with a plurality of applications installed in the UE, according to one or more embodiments of the present disclosure.

Embodiments of the present disclosure will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

FIG. 1 illustrates a block diagram of a User Equipment (UE) 100 including a system 102 for performing decompression of page data associated with a plurality of applications installed in the UE 100, according to an embodiment of the present disclosure. In an embodiment of the present disclosure, the system 102 may be hosted on the UE 100. In an embodiment of the present disclosure, the UE 100 may correspond to, for example, a smartphone, a camera, a laptop computer, a desktop computer, a wearable device, or any other device. The UE 100 may include one or more processors 104, a plurality of modules 106, a memory 110, and an Input/Output (I/O) interface 108.

In an embodiment, the one or more processors 104 may be operatively coupled to each of the plurality of modules 106, the memory 110, and the I/O interface 108. In an embodiment, the one or more processors 104 may include at least one data processor for executing processes in a Virtual Storage Area Network (VSAN). The one or more processors 104 may include specialized processing units such as, for example, integrated system (bus) controllers, memory management control units, floating point units, graphics processing units, digital signal processing units, etc. In an embodiment, the one or more processors 104 may include a central processing unit (CPU), a graphics processing unit (GPU), or both. The one or more processors 104 may be, for example, one or more general processors, digital signal processors, application-specific integrated circuits, field-programmable gate arrays, servers, networks, digital circuits, analog circuits, combinations thereof, or other devices for analyzing and processing data. The one or more processors 104 may execute a software program, such as code generated manually (e.g., programmed) to perform the desired operation. In an embodiment of the present disclosure, the one or more processors 104 may be, for example, a general-purpose processor, such as the CPU, an application processor (AP), or the like, a graphics-only processing unit such as the GPU, a visual processing unit (VPU), and/or an Artificial Intelligence (AI)-dedicated processor such as a neural processing unit (NPU). In an embodiment of the present disclosure, the one or more processors 104 execute data, and instructions stored in the memory for performing decompression of the page data associated with the plurality of applications installed in the UE 100.

The one or more processors 104 may be disposed in communication with one or more input/output (I/O) devices via the respective I/O interface 108. The I/O interface 108 may employ, for example, communication code-division multiple access (CDMA), high-speed packet access (HSPA+), global system for mobile communications (GSM), long-term evolution (LTE), WiMax, or the like, etc.

Using the I/O interface 108, the system 102 may communicate with one or more I/O devices, for example, the user devices associated with human-to-human conversation. For example, the input device may be an antenna, microphone, touch screen, touchpad, storage device, transceiver, video device/source, etc. The output devices may be, for example, a printer, fax machine, video display (e.g., cathode ray tube (CRT), liquid crystal display (LCD), light-emitting diode (LED), plasma, Plasma Display Panel (PDP), Organic light-emitting diode display (OLED) or the like), audio speaker, etc.

The one or more processors 104 may be disposed in communication with a communication network via a network interface. In an embodiment, the network interface may be the I/O interface 108. The network interface may connect to the communication network to enable connection of the system 102 with the outside environment. The network interface may employ connection protocols including, for example, direct connect, Ethernet (e.g., twisted pair 10/100/1000 Base T), transmission control protocol/internet protocol (TCP/IP), token ring, IEEE 802.11a/b/g/n/x, etc. The communication network may include, for example, a direct interconnection, local area network (LAN), wide area network (WAN), wireless network (e.g., using Wireless Application Protocol), the Internet, and the like.

In some embodiments, the memory 110 may be communicatively coupled to the one or more processors 104. The memory 110 may be configured to store the data and the instructions executable by the one or more processors 104 for performing decompression of the page data associated with the plurality of applications installed in the UE 100. Further, the memory 110 may include, for example, a non-transitory computer-readable storage media, such as various types of volatile and non-volatile storage media including, for example, random access memory (RAM), dynamic random access memory (DRAM), read-only memory, programmable read-only memory, electrically programmable read-only memory, electrically erasable read-only memory, flash memory, magnetic tape or disk, optical media and the like. In an example, the memory 110 may include a cache or random-access memory for the one or more processors 104. In an example, the memory is separate from the one or more processors 104, such as a cache memory of a processor, the system memory, or other memory. The memory 110 may be an external storage device or database for storing data. The memory 110 may be operable to store instructions executable by the one or more processors 104. The functions, acts, or tasks illustrated in the figures or described may be performed by the programmed processor/controller for executing the instructions stored in the memory 110. The functions, acts, or tasks are independent of the particular type of instruction set, storage media, processor, or processing strategy and may be performed by software, hardware, integrated circuits, firmware, micro-code, and the like, operating alone or in combination. Likewise, processing strategies may include, for example, multiprocessing, multitasking, parallel processing, and the like.

In some embodiments, the plurality of modules 106 may be included within the memory 110. The memory 110 may further include a database 112 that stores the data for performing decompression of the page data associated with the plurality of applications installed in the UE 100. The plurality of modules 106 may include a set of instructions that may be executed to cause the system 102 to perform any one or more of the methods/processes disclosed herein. The plurality of modules 106 may be configured to perform operations according to embodiments of the present disclosure using the data stored in the database 112 and the one or more processors 104 for performing decompression of page data associated with the plurality of applications installed in the UE 100, as described herein. In an embodiment, each of the plurality of modules 106 may be a hardware unit disposed outside of the memory 110. Further, the memory 110 may include an operating system 114 that performs one or more tasks of the UE 100, as performed by a generic operating system in the communications domain. In an embodiment, the database 112 may be configured to store the information as utilized by the plurality of modules 106 and the one or more processors 104 for performing decompression of page data associated with the plurality of applications installed in the UE 100.

Further, embodiments of the present disclosure also contemplate a computer-readable medium that includes instructions or receives and executes instructions responsive to a propagated signal. Further, the instructions may be transmitted or received over the network via a communication port or interface or using a bus. The communication port or interface may be a part of the one or more processors 104 or may be a separate component. The communication port may be created in software or may be a physical connection in hardware. The communication port may be configured to connect with, for example, a network, external media, the display, or any other components in the UE 100, or combinations thereof. The connection with the network may be a physical connection, such as a wired Ethernet connection, or may be established wirelessly. Likewise, the additional connections with other components of the UE 100 may be physical or may be established wirelessly. The network may alternatively be directly connected to the bus. For the sake of brevity, the architecture and standard operations of the operating system 114, the memory 110, the database 112, and the one or more processors 104 are not discussed in detail.

In an embodiment of the present disclosure, the one or more processors 104 may be configured to detect a context-switching event between at least one first application among the plurality of applications and at least one second application among the plurality of applications. In an embodiment of the present disclosure, the context-switching event corresponds to an event that indicates a switching operation between at least two applications among the plurality of applications installed in the UE.

Further, the one or more processors 104 may be configured to prefetch, in a memory buffer from an input memory of the UE, compressed data including a plurality of tokens based on the detection of the context-switching event. In prefetching of the compressed data, the one or more processors 104 may be configured to fetch one or more lines of the compressed data from the input memory based on available memory space in the memory buffer. Further, the one or more processors 104 may be configured to maintain a count for each of the plurality of tokens of the compressed data that has been read from the input memory.

Furthermore, the one or more processors 104 may be configured to parse each of the plurality of tokens of the prefetched compressed data from the memory buffer. In an embodiment of the present disclosure, the re-encoded prefetched compressed data is stored in the instruction queue based on an availability of memory space in the instruction queue of the output handler.

The one or more processors 104 may be configured to identify a data format of each of the plurality of tokens of the prefetched compressed data by decoding each of the plurality of parsed tokens. In an embodiment of the present disclosure, the data format of each of the plurality of tokens of the compressed data include literal, zero Run Length Encoding (RLE), look-back copy (LBC)/dictionary copy, or any combination thereof.

Further, the one or more processors 104 may be configured to re-encode each of the parsed tokens based on the identified data format. In re-encoding of the parsed tokens, the one or more processors 104 may be configured to determine whether a sum of length of consecutive parsed tokens is less than a line width of the output memory. Further, the one or more processors 104 may be configured to re-encoding, upon a determination that the sum of length of the consecutive parsed tokens is less than the line width of the output memory, the parsed tokens by combining the consecutive parsed tokens.

In re-encoding of the parsed tokens, the one or more processors 104 may be configured to determine whether the data format of a first parsed token is literal and a sum of length of consecutive parsed tokens including the first parsed token is greater than a line width of the output memory. Further, the one or more processors 104 may be configured to re-encode the first parsed token when the length of the first parsed token is less than the line width of the output memory. The reencode operation is performed upon a determination that the data format of the first parsed token is literal and the sum of length of the consecutive parsed tokens including the first parsed token is greater than the line width of the output memory.

Further, in the re-encoding of the parsed tokens, the one or more processors 104 may be configured to determine whether the data format of a first parsed token is literal and a sum of length of consecutive parsed tokens including the first parsed token is greater than the line width of the output memory. Furthermore, the one or more processors 104 may be configured to split the first parsed token into a plurality of sub-tokens where a maximum length of a sub-token is equal to the line width of the output memory. The split operation is performed upon a determination that the data format of the first parsed token is literal and the sum of length of the consecutive parsed tokens including the first parsed token is greater than the line width of the output memory. The one or more processors 104 are further configured to re-encode the sub-tokens based on the splitting of the first parsed token.

Furthermore, in re-encoding of the parsed tokens, the one or more processors 104 may be configured to determine whether the data format of a first parsed token is zero RLE or the LBC copy, and a sum of length of consecutive parsed tokens including the first parsed token is greater than the line width of the output memory. Further, the one or more processors 104 may be configured to re-encode the first parsed token upon a determination that the data format of the first parsed token is the zero RLE or the LBC copy, and the sum of length of the consecutive parsed tokens including the first parsed token is greater than the line width of the output memory.

The one or more processors 104 may also be configured to temporarily store the re-encoded parsed tokens in an instruction queue of an output handler. The output handler may also be referred to as an output handler circuit.

Furthermore, the one or more processors 104 may be configured to generate decompressed data based on a format of the re-encoded parsed tokens. In generating the decompressed data, the one or more processors 104 may be configured to extract literal data from the instruction queue of the output handler. Further, the one or more processors 104 may be configured to perform a writing operation to write the extracted literal data directly into the output packer of the output handler. In an embodiment of the present disclosure, the output packer is an internal memory buffer of the output handler for storing the decompressed data. The output packer may also be referred to as an output packer circuit.

In generating the decompressed data, the one or more processors 104 may be configured to extract zero RLE length from the instruction queue of the output handler. Further, the one or more processors 104 may be configured to perform a writing operation to write, into the output packer of the output handler, the zero RLE length by inserting appropriate amount of zeros based on a zero RLE length.

Further, in generating the decompressed data, the one or more processors 104 may be configured to fetch dictionary copy data by extracting offset and length of the dictionary copy data from the instruction queue of the output handler. Further, the one or more processors 104 may be configured to perform a writing operation to write the fetched dictionary copy data into the output packer of the output handler.

The one or more processors 104 may also be configured to continuously collect the generated decompressed data into an output packer of the output handler.

Further, the one or more processors 104 may also be configured to perform a writing operation to write a single line of the data from the collected decompressed data into the output memory, based on a configuration of the output memory of the UE. In writing operation to write the fetched dictionary copy data into the output packer, the one or more processors 104 may be configured to obtain, upon extracting the offset and the length of the fetched dictionary copy data from the instruction queue, a past data reference from the output memory. Further, the one or more processors 104 may be configured to read the fetched dictionary copy data from the output memory based on the obtained past data reference. The one or more processors 104 may be configured to write the fetched dictionary copy data into the output packer based on the reading of the fetched dictionary copy data from the output memory.

In performing a writing operation to write the fetched dictionary copy data into the output packer, the one or more processors 104 may be configured to obtain, upon extracting the offset and the length of the fetched dictionary copy data from the instruction queue, a past data reference from the output packer. Further, the one or more processors 104 may be configured to read the fetched dictionary copy data from the output packer based on the obtained past data reference. The one or more processors 104 may be configured to write the fetched dictionary copy data into the output packer based on the reading operation performed on the fetched dictionary copy data from the output packer.

In performing a writing operation to write the fetched dictionary copy data into the output packer, the one or more processors 104 may be configured to obtain a past data reference from the output memory and the output packer corresponding to the fetched dictionary copy data. The one or more processors 104 obtain the past data reference upon extracting the offset and the length of the fetched dictionary copy data from the instruction queue. Further, the one or more processors 104 may be configured to read the past data reference that is obtained from the output memory and the output packer, the fetched dictionary copy data that is present in the output memory and the output packer. Furthermore, the one or more processors 104 may be configured to combine, upon reading of the fetched dictionary copy data, the fetched dictionary copy data from the output memory and the output packer. The one or more processors 104 may be configured to write the combined dictionary copy data into the output packer based on the fetched dictionary copy data.

Figure 2:
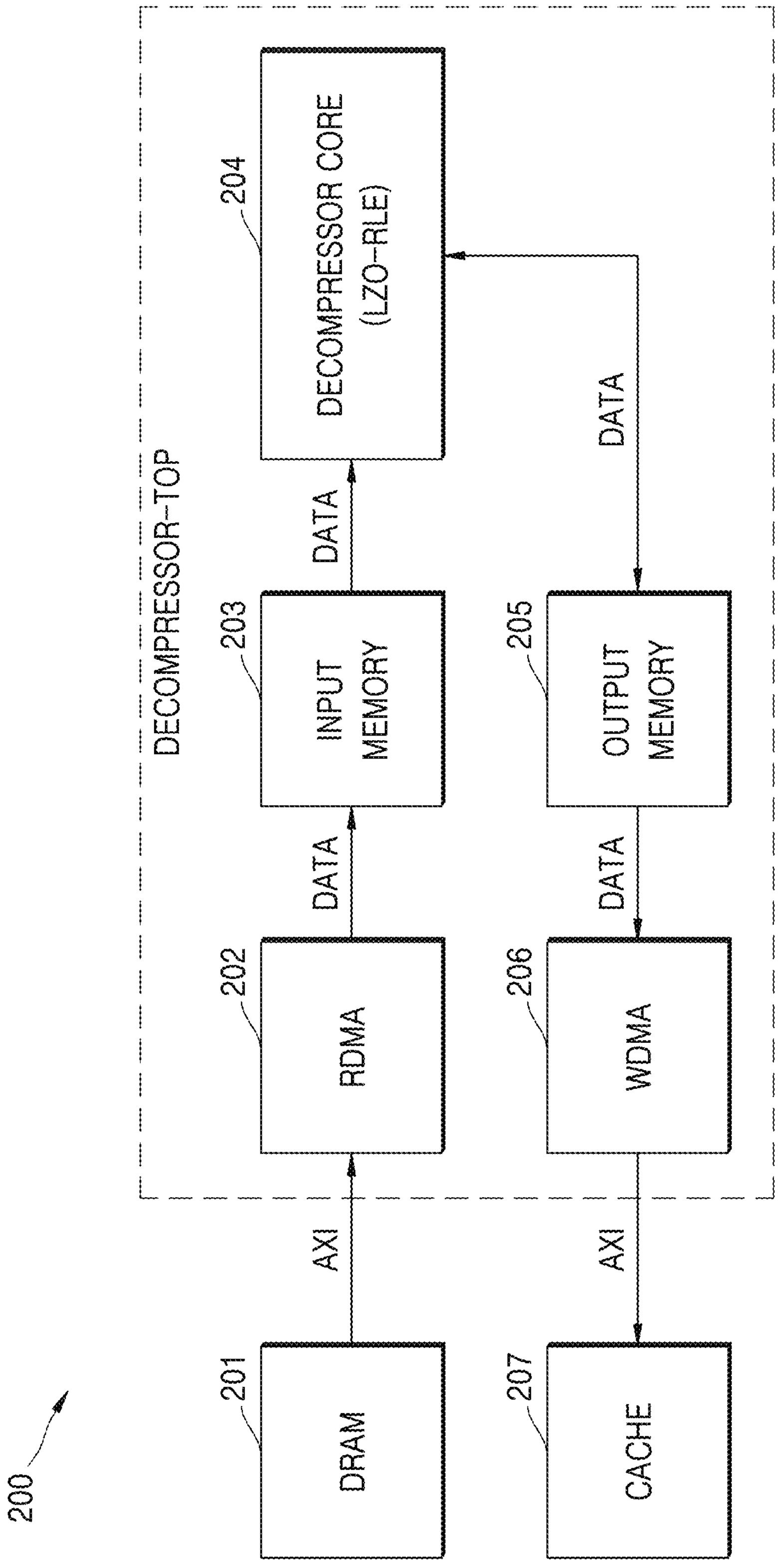
FIG. 2 illustrates a block diagram of an interactive system overview among multiple components of the memory, according to one or more embodiments of the present disclosure.

FIG. 2 illustrates a block diagram 200 of an interactive system overview among multiple components of the memory 110, according to one or more embodiments of the present disclosure. In one or more embodiments of the present disclosure, the memory 110 may include a Read Direct Memory Access (RDMA) controller 202 that reads compressed page data from the DRAM 201 and writes the compressed page data into an input memory 203. Subsequently, a decompressor core 204 parses the input tokens from the input memory 203, further decompressing the data with reduced latency, and sending the decompressed data to an output memory 205. Detailed working operations of the decompression core will be further described with reference to FIG. 3. Further, a Write Direct Memory Access (WDMA) controller 206 writes the decompressed data from the output memory 205 to a CPU cache 207.

Figure 3:
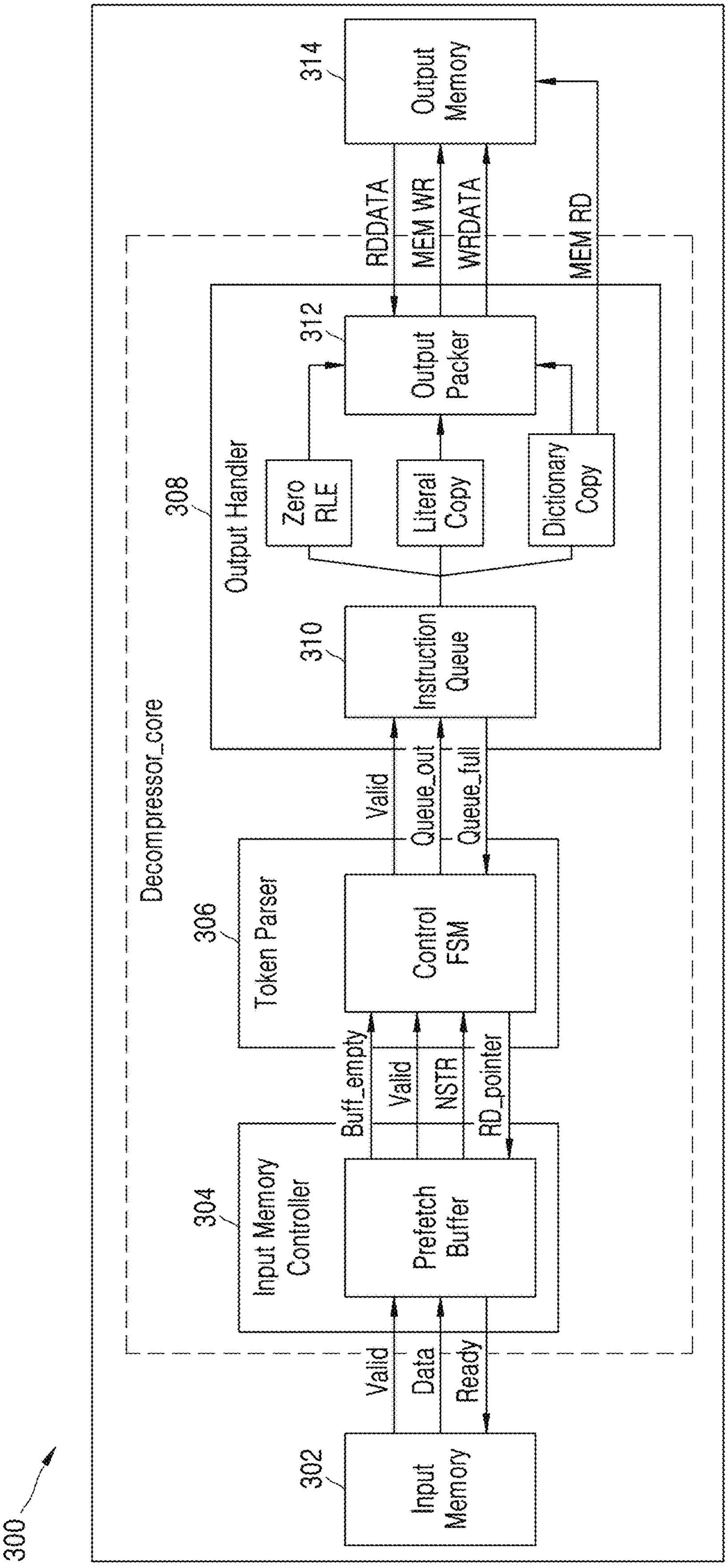
FIG. 3 illustrates a detailed flow diagram of the plurality of modules in the decompressor core, according to one or more embodiments of the present disclosure.

FIG. 3 illustrates a detailed flow diagram 300 of the plurality of modules 106 in the decompressor core, according to one or more embodiments of the present disclosure. In one or more embodiments, the decompressor core includes a prefetch buffer that prefetches and stores compressed data, a token parser 306 that decodes and identifies data format and re-encodes the data, and an output handler 308 that generates the decompressed data.

In one or more embodiments, the input memory controller 304 may include a prefetch buffer which is used for prefetching of the compressed data for faster processing of a plurality of tokens, where the token may be interpreted as an individual instruction in the compressed data. The prefetching is performed so that delays related to compressed data fetch from the input memory 302 may be avoided. Whenever sufficient space is available in the prefetch buffer, then the prefetch buffer may fetch the next available compressed data from the input memory 302. The prefetch buffer also maintains a count of the compressed data that has been read from the input memory 302 and accordingly manages buffer full/empty scenarios.

The prefetched buffer may fetch multiple lines of data from the input memory 302. The prefetched buffer may not process the plurality of tokens one by one, but rather, may fetch the plurality of tokens at once for further processing. As a result, the prefetched buffer may achieve faster parsing.

In one or more embodiments, the token parser 306 may perform the parsing of the plurality of tokens by receiving the compressed data (including the plurality of tokens) from the prefetch buffer. The token parser 306 may generate decoded data after decoding each of the plurality of tokens in the compressed data to identify the data format of the respective tokens. The data format of the token may be classified as, for example, a literal, a Zero Run Length Encoding (RLE), or a Look-Back Copy (LBC) e.g., dictionary copy. The token that has the literal data format may be referred to as a literal string. The literal string may not be compressed as there is no reference data available for the literal string. However, if the token is repeated later, then the same token may get compressed by reference to its original literal string so that such type of compression may be known as a dictionary copy or look-back copy. Further, the Zero-RLE is a count of number of consecutive zeros present in the data.

The token parser 306 may include a control Finite State Machine (FSM) which may parse the plurality of tokens having different data formats, re-encode the decoded data and pass the re-encoded data to an instruction queue 310 in a format that enables easy handling by the output handler 308. The re-encoding may be performed to speed up the operation and also to reduce the dependency with respect to the analysis of the tokens.

In one or more embodiments, the output handler 308 having the instruction queue 310 and an output packer, may process re-encoded data from the instruction queue 310. The re-encoded data may be directly extracted from the instruction queue 310 in the case of literal data format, generated in the case of RLE data format, or fetched from the output memory or an output packer in the case of LBC data format. The output handler 308 may pack the decompressed data into the output packer followed by writing to the output memory. The output handler 308 may be implemented in a pipelined manner so that the instruction queue 310 reads are not stalled except in the case of a long dictionary copy or long zero-RLE. Since the dictionary copy utilizes multiple cycles to complete processing due to memory address calculation and memory read latency, a pipelined implementation may provide zero wait cycles for the output handler 308. Accordingly, the output packer continuously (e.g., in a pipelined manner, without stall) reads the decompressed data and writes the decompressed data to the output memory.

The conventional decompression process is a complete sequential operation. So, to avoid the waiting cycle for the token parser to complete the output data writing in the output memory 314, parallel operations may be performed in a way that the token parser may individually operate without the need for completing the output memory 314 parsing by the output handler 308. As a result, the instruction queue 310 is placed in between the token parser and the output handler 308, so that as long as the instruction queue 310 is available, the data may be provided to the instruction queue 310 without waiting for the output handler 308 to complete the operations.

The output memory 314 may have a fixed size with depth being variable. As a result, there may be a fixed size for a particular configuration. For example, the fixed size may either be 16 bytes or 32 bytes in width. Thus, based on the configuration of the output memory 314, the output packer may combine the data that is generated by the output handler 308. The combination of data takes place in the data packer until it forms a single line which is in accordance with the configuration of the output memory 314. Once the single line is ready in the output packer, then the output packer may write the single line in the output memory 314.

Figure 4:
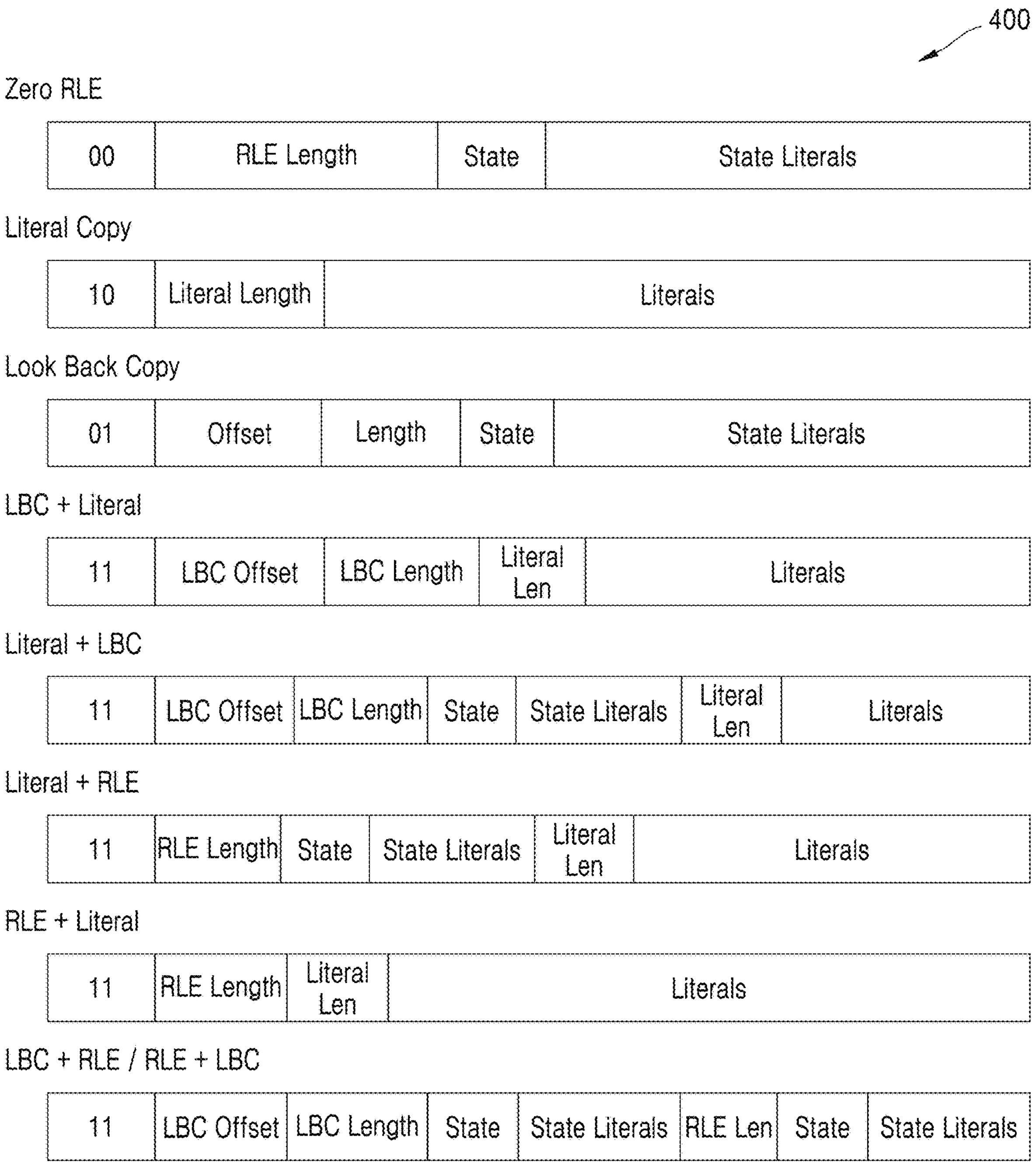
FIG. 4 illustrates a block diagram of a format of the reformatted tokens, according to one or more embodiments of the present disclosure.

FIG. 4 illustrates a block diagram 400 of a format of the reformatted tokens, according to one or more embodiments of the present disclosure. Each of the tokens among the plurality of tokens may be classified into, for example, literal, the Zero RLE, or the LBC data format. The different tokens with different or the same data format may have variable lengths. The token parser may extract information such as, for example, length, offset, state, and everything in common. Subsequently, the token parser may perform the re-encoding based on the length of the token. A combination of the consecutive tokens may only be performed when the combined length is less than the width of the output memory 314.

Figure 5:
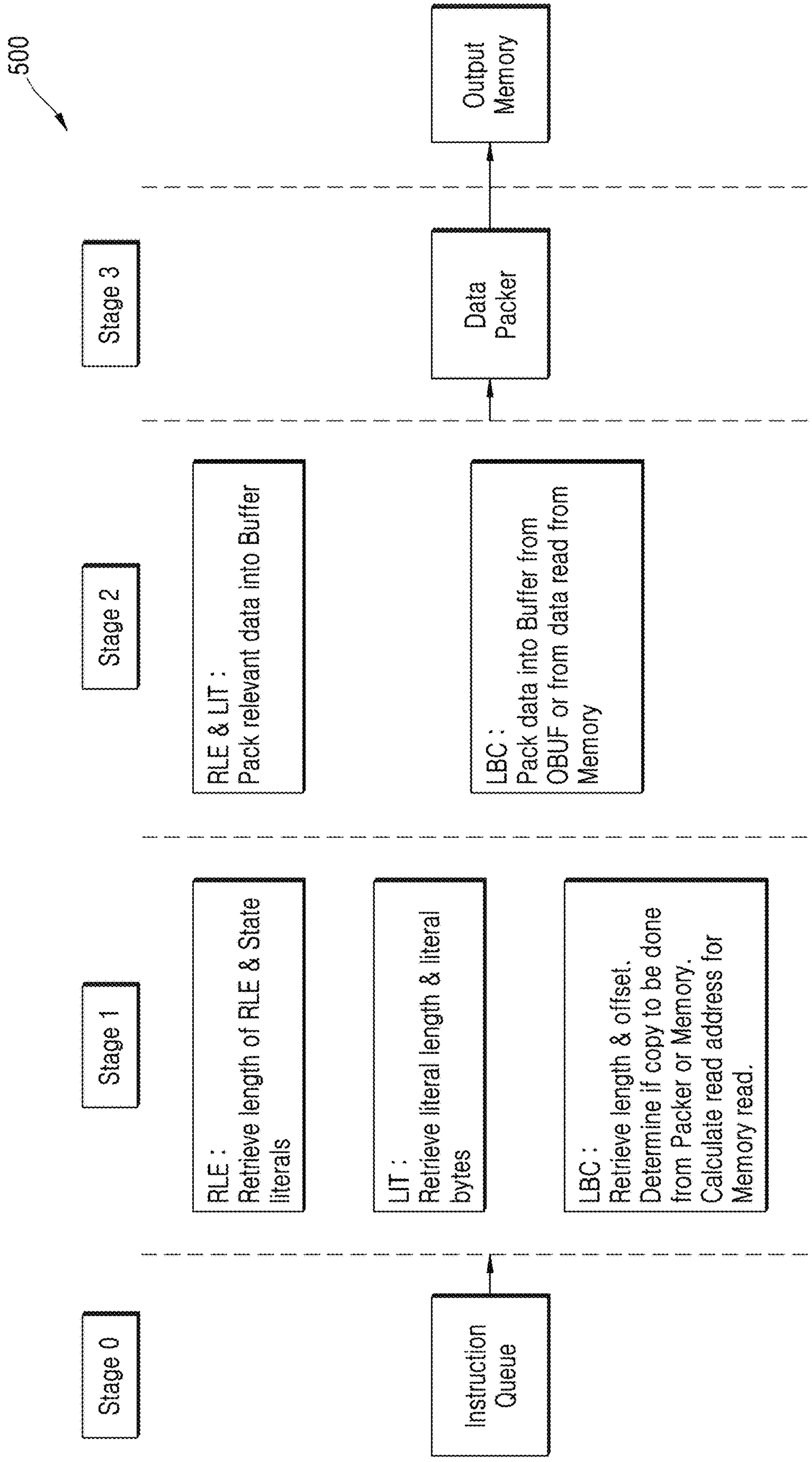
FIG. 5 illustrates a pictorial representation of pipeline stages in the output handler block, according to one or more embodiments of the present disclosure.

FIG. 5 illustrates a pictorial representation of pipeline stages 500 in the output handler block, according to one or more embodiments of the present disclosure. The pipeline is divided into four stages from stage 0 to stage 3. Stages 1, 2, and 3 may process the data depending on the data format. In stage 0 the data may be read from the instruction queue 310. In stages 1 and 2 the data may be processed depending on the data format. In stage 1, if the data format is the RLE, then the length of data having the RLE data format and the state literals may be retrieved. If the data format is the Literal (LIT), then the length of data having literal data format and the literal bytes may be retrieved. However, if the data format is the LBC, then the length and offset of the data may be retrieved. The output handler 308 in the case of the LBC data format may determine if the copy needs to be fetched from the output packer, the output memory 314, or both.

In stage 2 of the output handler 308, if the data format is RLE or LIT, then the data is fetched or extracted and may be sent to an internal pack buffer. Similarly, if the data format is LBC, then the data may be fetched from the output packer, the output memory 314, or both, and subsequently may be sent to an internal pack buffer. Consequently, in stage 3, the data from the internal pack buffer is sent to the output packer. Once the single line is ready in the output packer, then the output packer may write the single line in the output memory 314.

Figure 6:
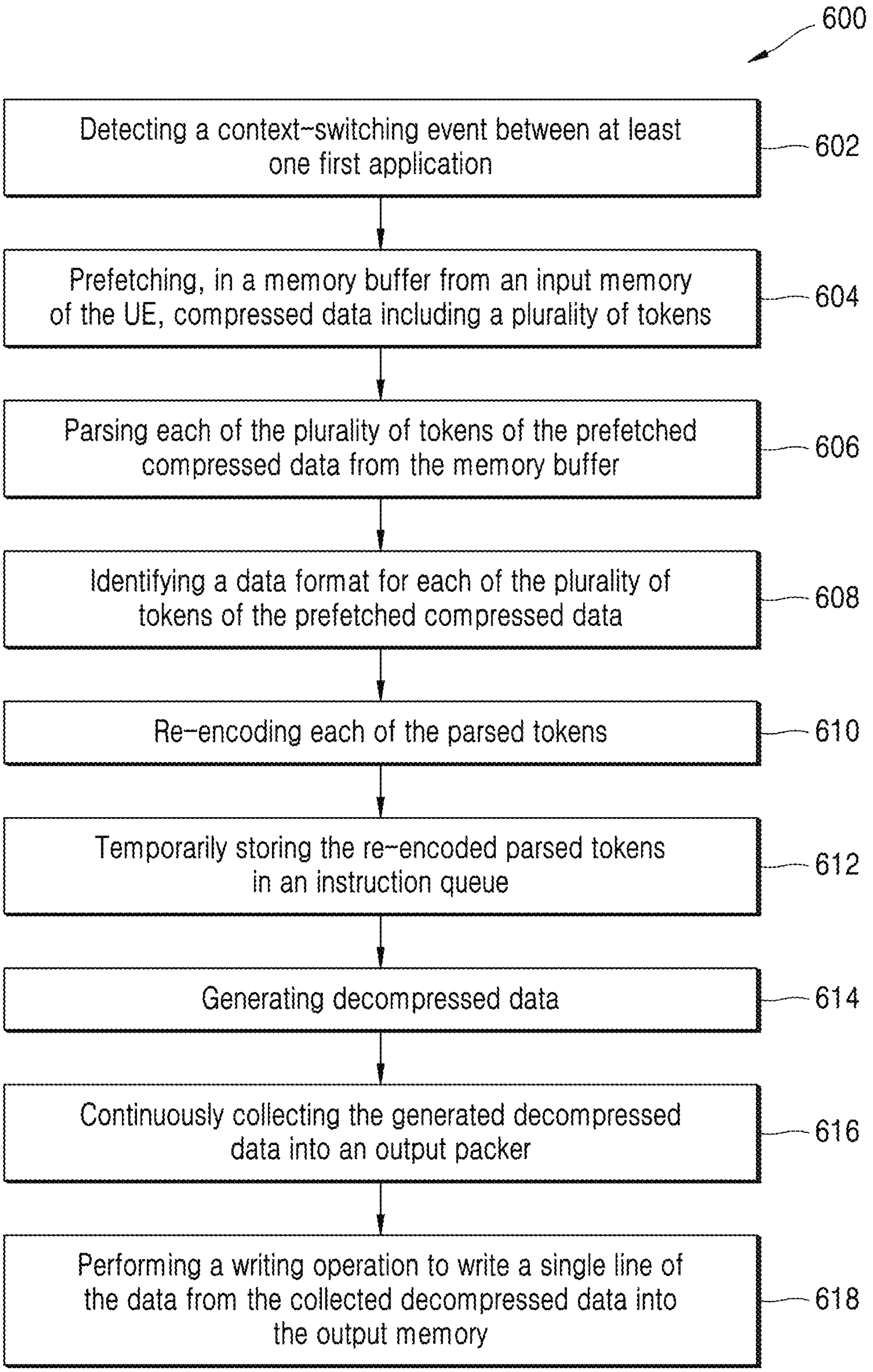
FIG. 6 is a flow diagram illustrating a method of performing decompression of page data associated with a plurality of applications installed in the UE, according to one or more embodiments of the present disclosure.

FIG. 6 is a flow diagram 600 (also referred to as a method 600) illustrating a method of performing decompression of page data associated with a plurality of applications installed in the UE 100, according to one or more embodiments of the present disclosure.

The method 600 of performing decompression of page data associated with the plurality of applications installed in the UE 100 (also referred to as "the method 600") includes a series of operations 602 through 618 of FIG. 6. The operations included in the method 600 may be performed by the one or more components of the system 102, where the processor 104 is controlling each of the respective components of the system 102 using the instructions stored in the memory 110. The method 600 begins at operation 602.

At operation 602, the method 600 may include detecting a context-switching event between at least one first application among the plurality of applications and at least one second application among the plurality of applications.

In one or more embodiments, the method 600 may include the context-switching event corresponding to an event that indicates a switching operation between at least two applications among the plurality of applications installed in the UE 100.

At operation 604, the method 600 may include prefetching, in a memory buffer from an input memory of the UE 100, compressed data including a plurality of tokens based on the detection of the context-switching event.

In one or more embodiments, the method 600 may include fetching one or more lines of the compressed data from the input memory based on available memory space in the memory buffer. The method 600 may further include maintaining a count for each of the plurality of tokens of the compressed data that has been read from the input memory.

At operation 606, the method 600 may include parsing each of the plurality of tokens of the prefetched compressed data from the memory buffer.

At operation 608, the method 600 may include identifying a data format of each of the plurality of tokens of the prefetched compressed data by decoding each of the plurality of parsed tokens.

In one or more embodiments, the data format of each of the plurality of tokens of the compressed data comprises at least one of the literal, the zero RLE, and the LBC/dictionary copy.

At operation 610, the method 600 may include re-encoding each of the parsed tokens based on the identified data format.

In one or more embodiments, the method 600 may include determining whether a sum of the length of consecutive parsed tokens is less than a line width of the output memory 314. The method 600 may further include re-encoding, upon a determination that the sum of the length of the consecutive parsed tokens is less than the line width of the output memory 314, the parsed tokens by combining the consecutive parsed token.

In one or more embodiments, the method 600 may include determining whether the data format of a first parsed token is literal and whether a sum of the length of consecutive parsed tokens including the first parsed token is greater than a line width of the output memory 314. The method 600 may further include re-encoding, upon a determination that the data format of the first parsed token is literal and the sum of the length of the consecutive parsed tokens including the first parsed token is greater than the line width of the output memory 314, the first parsed token when the length of the first parsed token is less than the line width of the output memory 314.

In one or more embodiments, the method 600 may include determining whether the data format of a first parsed token is literal and whether a sum of the length of consecutive parsed tokens including the first parsed token is greater than the line width of the output memory 314. The method 600 may further include splitting, upon a determination that the data format of the first parsed token is literal and the sum of the length of the consecutive parsed tokens including the first parsed token is greater than the line width of the output memory 314, the first parsed token into a plurality of sub-tokens where a maximum length of a sub-token is equal to the line width of the output memory 314. Subsequently, the method 600 may include re-encoding the sub-tokens based on the splitting of the first parsed token.

In one or more embodiments, the method 600 may include determining whether the data format of a first parsed token is the zero RLE or the LBC copy, and a sum of the length of consecutive parsed tokens including the first parsed token is greater than the line width of the output memory 314. The method 600 may further include re-encoding the first parsed token upon a determination that the data format of the first parsed token is the zero RLE or the LBC copy, and the sum of the length of the consecutive parsed tokens including the first parsed token is greater than the line width of the output memory 314.

At operation 612, the method 600 may include temporarily storing the re-encoded parsed tokens in an instruction queue of an output handler.

In one or more embodiments, the method 600 may include the re-encoded prefetched compressed data stored in the instruction queue based on an availability of memory space in the instruction queue of the output handler.

At operation 614, the method 600 may include generating decompressed data based on a format of the re-encoded parsed tokens.

In one or more embodiments, the method 600 may include extracting the zero RLE length from the instruction queue of the output handler. The method 600 may further include performing a writing operation to write, into the output packer of the output handler, the zero RLE length by inserting an appropriate amount of zeros based on a zero RLE length.

In one or more embodiments, the method 600 may include fetching dictionary copy data by extracting an offset and length of the dictionary copy data from the instruction queue of the output handler. The method 600 may further include performing a writing operation to write the fetched dictionary copy data into the output packer of the output handler.

In one or more embodiments, the method 600 may include obtaining, upon extracting the offset and the length of the fetched dictionary copy data from the instruction queue, a past data reference from the output memory 314. The method 600 may further include reading the fetched dictionary copy data from the output memory 314 based on the obtained past data reference. Consequently, the method 600 may include writing the fetched dictionary copy data into the output packer based on the reading of the fetched dictionary copy data from the output memory 314.

In one or more embodiments, the method 600 may include obtaining, upon extracting the offset and the length of the fetched dictionary copy data from the instruction queue, a past data reference from the output packer. The method 600 may further include reading the fetched dictionary copy data from the output packer based on the obtained past data reference. Consequently, the method 600 may include writing the fetched dictionary copy data into the output packer based on the reading operation performed on the fetched dictionary copy data from the output packer.

In one or more embodiments, the method 600 may include obtaining, upon extracting the offset and the length of the fetched dictionary copy data from the instruction queue, a past data reference from the output memory 314 and the output packer corresponding to the fetched dictionary copy data. The method 600 may further include reading the past data reference that is obtained from the output memory 314 and the output packer, the fetched dictionary copy data that is present in the output memory 314 and the output packer. The method 600 may further include combining, upon reading the fetched dictionary copy data, the fetched dictionary copy data from the output memory 314 and the output packer. Consequently, the method 600 may include writing the combined dictionary copy data into the output packer based on the fetched dictionary copy data.

At operation 616, the method 600 may include continuously collecting the generated decompressed data into an output packer of the output handler.

In one or more embodiments, the method 600 may include the output packer as an internal memory buffer of the output handler for storing the decompressed data.

At operation 618, the method 600 may include performing a writing operation to write a single line of the data from the collected decompressed data into the output memory 314, based on a configuration of the output memory 314 of the UE 100.

While the above operations shown in FIG. 6 are described in a particular sequence, the operations may occur in variations to the sequence in accordance with various embodiments of the present disclosure. Further, for convenience of explanation, details related to various operations of FIG. 6, which are already described with reference to FIGS. 1-5, are not described further herein.

The plurality of modules 106 may be implemented by any suitable hardware and/or set of instructions via the one or more processors 104. Further, the sequential flow associated with the plurality of modules 106 illustrated in FIG. 1 is exemplary in nature, and embodiments may include the addition/omission of operations. In some embodiments, the one or more operations performed by the plurality of modules 106 may be performed by the one or more processors 104.

Embodiments of the present disclosure provide for various technical advancements based on the features described above. Embodiments of the present application may increase background app launch performance by quick decompression of page data stored in DRAM with minimal system overhead. Embodiments of the present disclosure may be used for one or more Lempel-Ziv (LZ)-family of techniques.

As is traditional in the field of the present disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the present disclosure has been particularly shown and described with reference to embodiments thereof, it will be understood by those of ordinary skill in the art that various changes in form and detail may be made therein without departing from the spirit and scope of the present disclosure as defined by the following claims.

What is claimed is:

1. A method implemented in a User Equipment (UE) for performing decompression of page data associated with a plurality of applications installed in the UE, the method comprising:
- detecting a context-switching event between at least one first application among the plurality of applications and at least one second application among the plurality of applications;
- prefetching, in a memory buffer from an input memory of the UE, compressed data including a plurality of tokens based on detecting the context-switching event;
- parsing each of the plurality of tokens of the prefetched compressed data from the memory buffer;
- identifying a data format of each of the plurality of tokens of the prefetched compressed data by decoding each of the plurality of parsed tokens;
- re-encoding each of the parsed tokens based on the identified data format;
- temporarily storing the re-encoded parsed tokens in an instruction queue of an output handler;
- generating decompressed data based on a format of the re-encoded parsed tokens;
- continuously collecting the generated decompressed data into an output packer of the output handler; and
- performing a writing operation to write a single line of the data from the collected decompressed data into an output memory of the UE, based on a configuration of the output memory.

2. The method as claimed in claim 1, wherein prefetching the compressed data comprises:
- fetching one or more lines of the compressed data from the input memory based on an available memory space in the memory buffer; and
- maintaining a count for each of the plurality of tokens of the compressed data that has been read from the input memory.

3. The method as claimed in claim 1, wherein the data format of each of the plurality of tokens of the compressed data comprises at least one of literal, zero Run Length Encoding (RLE), and look-back copy (LBC)/dictionary copy.

4. The method as claimed in claim 1, wherein re-encoding the parsed tokens comprises:
- determining whether a sum of length of consecutive parsed tokens is less than a line width of the output memory;
- re-encoding, upon a determination that the sum of length of the consecutive parsed tokens is less than the line width of the output memory, the parsed tokens by combining the consecutive parsed tokens.

5. The method as claimed in claim 1, wherein re-encoding the parsed tokens comprises:
- determining whether the data format of a first parsed token is literal and a sum of length of consecutive parsed tokens including the first parsed token is greater than a line width of the output memory; and
- re-encoding, upon a determination that the data format of the first parsed token is literal and the sum of length of the consecutive parsed tokens including the first parsed token is greater than the line width of the output memory (314), the first parsed token when the length of the first parsed token is less than the line width of the output memory.

6. The method as claimed in claim 1, wherein re-encoding the parsed tokens comprises:
- determining whether the data format of a first parsed token is literal and a sum of length of consecutive parsed tokens including the first parsed token is greater than a line width of the output memory;
- splitting, upon a determination that the data format of the first parsed token is literal and the sum of length of the consecutive parsed tokens including the first parsed token is greater than the line width of the output memory, the first parsed token into a plurality of sub-tokens, wherein a maximum length of a sub-token is equal to the line width of the output memory; and
- re-encoding the sub-tokens based on the splitting of the first parsed token.

7. The method as claimed in claim 1, wherein re-encoding the parsed tokens comprises:
- determining whether the data format of a first parsed token is zero Run Length Encoding (RLE) or look-back copy (LBC) copy, and a sum of length of consecutive parsed tokens including the first parsed token is greater than a line width of the output memory;
- re-encoding the first parsed token upon a determination that the data format of the first parsed token is the zero RLE or the LBC copy, and the sum of length of the consecutive parsed tokens including the first parsed token is greater than the line width of the output memory.

8. The method as claimed in claim 1, wherein generating the decompressed data comprises:
- extracting literal data from the instruction queue of the output handler; and
- performing another writing operation to write the extracted literal data directly into the output packer of the output handler.

9. The method as claimed in claim 1, wherein generating the decompressed data comprises:
- extracting zero Run Length Encoding (RLE) length from the instruction queue of the output handler; and
- performing another writing operation to write, into the output packer of the output handler, the zero RLE length by inserting an appropriate amount of zeros based on a zero RLE length.

10. The method as claimed in claim 1, wherein generating the decompressed data comprises:
- fetching dictionary copy data by extracting an offset and a length of the dictionary copy data from the instruction queue of the output handler; and
- performing another writing operation to write the fetched dictionary copy data into the output packer of the output handler.

11. The method as claimed in claim 10, wherein performing the another writing operation to write the fetched dictionary copy data into the output packer comprises:
- obtaining, upon extracting the offset and the length of the fetched dictionary copy data from the instruction queue, a past data reference from the output memory;
- reading the fetched dictionary copy data from the output memory based on the obtained past data reference; and writing the fetched dictionary copy data into the output packer based on the reading of the fetched dictionary copy data from the output memory.

12. The method as claimed in claim 10, wherein performing the another writing operation to write the fetched dictionary copy data into the output packer comprises:

obtaining, upon extracting the offset and the length of the fetched dictionary copy data from the instruction queue, a past data reference from the output packer;

reading the fetched dictionary copy data from the output packer based on the obtained past data reference; and writing the fetched dictionary copy data into the output packer based on the reading operation performed on the fetched dictionary copy data from the output packer.

13. The method as claimed in claim 10, wherein performing the another writing operation to write the fetched dictionary copy data into the output packer comprises:

obtaining, upon extracting the offset and the length of the fetched dictionary copy data from the instruction queue, a past data reference from the output memory and the output packer corresponding to the fetched dictionary copy data;

reading the past data reference that is obtained from the output memory and the output packer, and the fetched dictionary copy data that is present in the output memory (314) and the output packer;

combining, upon reading of the fetched dictionary copy data, the fetched dictionary copy data from the output memory and the output packer; and writing the combined dictionary copy data into the output packer based on the fetched dictionary copy data.

14. The method as claimed in claim 1, wherein the re-encoded prefetched compressed data is stored in the instruction queue based on an availability of memory space in the instruction queue.

15. The method as claimed in claim 1, wherein the output packer is an internal memory buffer of the output handler for storing the decompressed data.

16. The method as claimed in claim 1, wherein the context-switching event corresponds to an event that indicates a switching operation between at least two applications among the plurality of applications installed in the UE.

17. A system implemented in a User Equipment (UE) for performing decompression of page data associated with a plurality of applications installed in the UE, the system comprising:

a memory; and one or more processors communicably coupled to the memory, wherein the one or more processors are configured to:

detect a context-switching event between at least one first application among the plurality of applications and at least one second application among the plurality of applications;

prefetch, in a memory buffer from an input memory of the UE, compressed data including a plurality of tokens based on detecting the context-switching event;

parse each of the plurality of tokens of the prefetched compressed data from the memory buffer;

identify a data format of each of the plurality of tokens of the prefetched compressed data by decoding each of the plurality of parsed tokens;

re-encode each of the parsed tokens based on the identified data format;

temporarily store the re-encoded parsed tokens in an instruction queue of an output handler;

generate decompressed data based on a format of the re-encoded parsed tokens;

continuously collect the generated decompressed data into an output packer of the output handler; and perform a writing operation to write a single line of the data from the collected decompressed data into an output memory of the UE, based on a configuration of the output memory.

18. The system as claimed in claim 17, wherein, in prefetching the compressed data, the one or more processors are configured to:

fetch one or more lines of the compressed data from the input memory based on an available memory space in the memory buffer; and maintain a count for each of the plurality of tokens of the compressed data that has been read from the input memory.

19. The system as claimed in claim 17, wherein the data format of each of the plurality of tokens of the compressed data comprises at least one of literal, zero Run Length Encoding (RLE), and look-back copy (LBC)/dictionary copy.

20. The system as claimed in claim 17, wherein, for re-encoding the parsed tokens, the one or more processors are configured to:

determine whether a sum of length of consecutive parsed tokens is less than a line width of the output memory; and re-encode, upon a determination that the sum of length of the consecutive parsed tokens is less than the line width of the output memory, the parsed tokens by combining the consecutive parsed tokens.

* * * * *